No. 626,998. Patented June 13, 1899.
J. HUBBARD.
WINDING MACHINE.
(Application filed Jan. 3, 1899.)
(No Model.) 2 Sheets—Sheet 1.
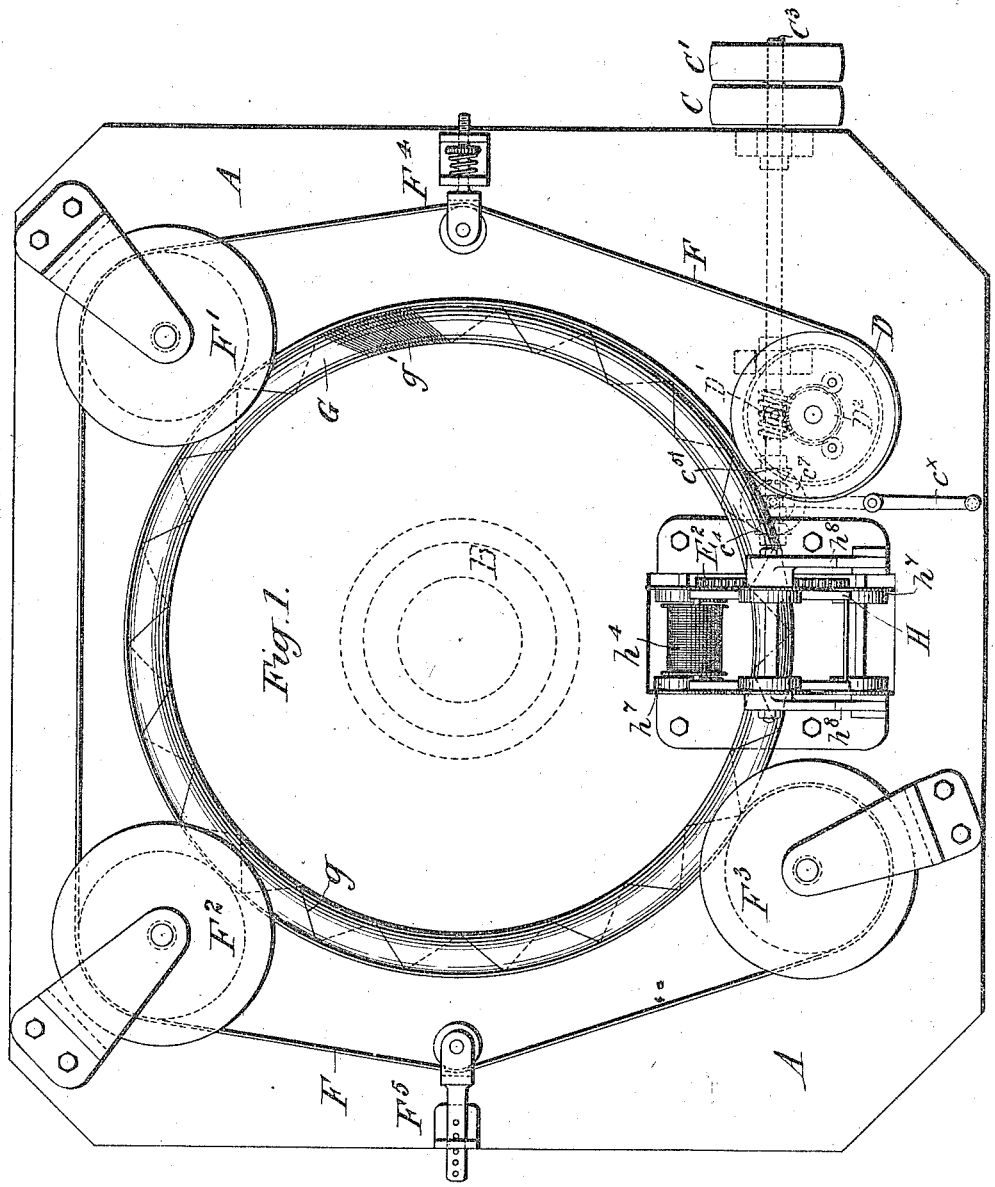
Witnesses:—
Jas. V. Richmond
W. C. Hill
Inventor
John Hubbard
by G. Dittmar
his Attorney No. 626,998. Patented June 13, 1899.
J. HUBBARD.
WINDING MACHINE.
(Application filed Jan. 3, 1899.)
(No Model.) 2 Sheets—Sheet 2.
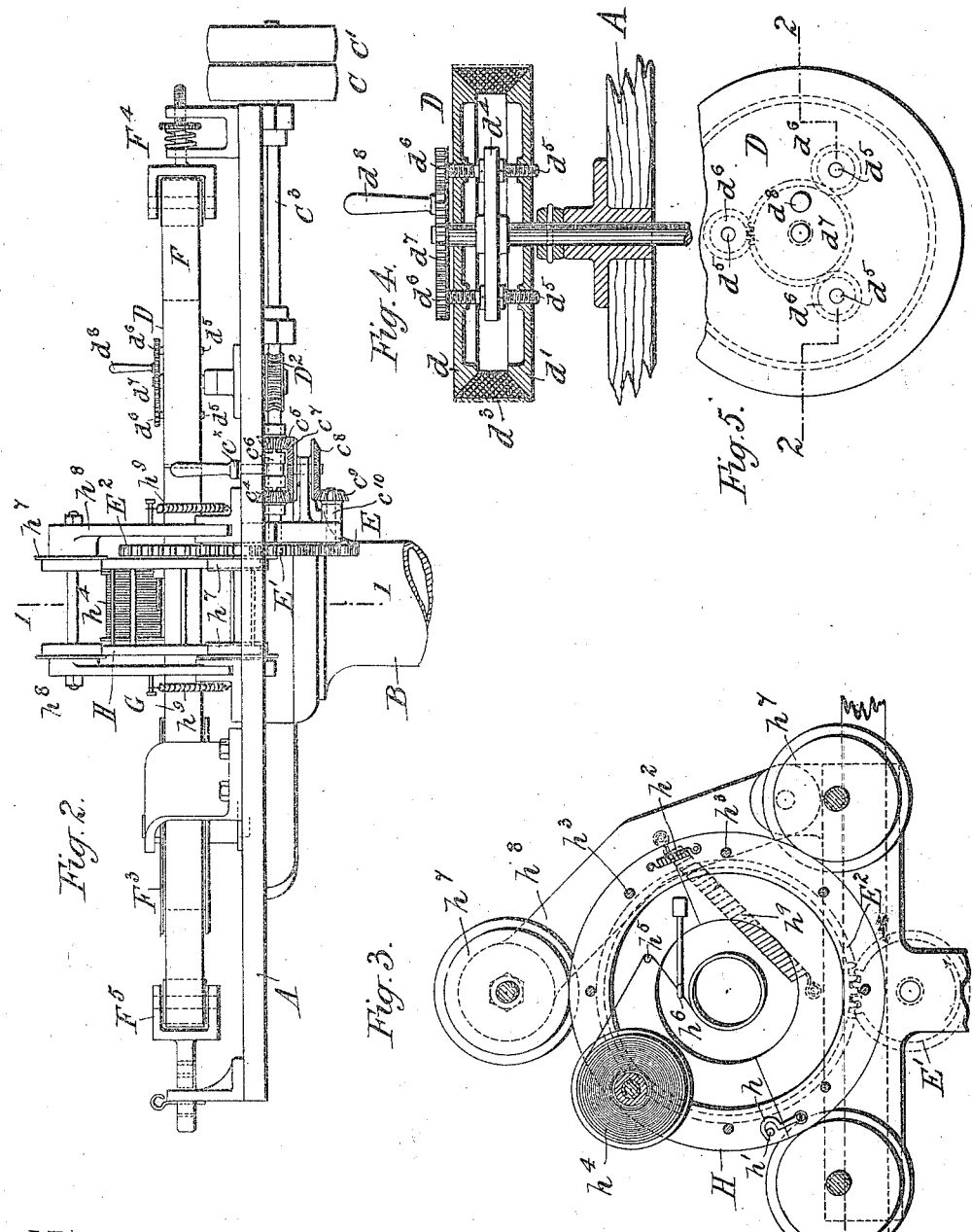
Witnesses:
Jas. A. Richmond
W. Hill
Inventor:
John Hubbard
by G. Dittmar
his Attorney

UNITED STATES PATENT OFFICE.

JOHN HUBBARD, OF LONDON, ENGLAND.

WINDING-MACHINE.

SPECIFICATION forming part of Letters Patent No. 626,998, dated June 13, 1899.

Application filed January 3, 1899. Serial No. 701,015. (No model.)

*To all whom it may concern:*

Be it known that I, JOHN HUBBARD, tire expert, a subject of the Queen of Great Britain, residing at 6 Pemberton Gardens, Upper Holloway, London, England, have invented an Improved Winding-Machine, of which the following is a specification.

This machine is designed to produce in an improved manner hose-pipe or other flexible tubes, such as are commonly employed for the pneumatic tires of bicycle-wheels and the like.

The object of my invention is to produce flexible tubes for pneumatic tires by winding upon an endless mandrel either of circular or loop form a thread or cord of fiber or metallic wire or a series of such threads or wires preferably at angles of forty-five or sixty degrees with the center line of the mandrel in a continuous layer covering the whole exterior surface of the mandrel. I then reverse the action of the winder and wind a series of threads or cords at the opposite angle to those previously wound, so that the strands in the two layers should cross one another at right angles or nearly at right angles. The numbers of layers would accord with the pressure the tube would be required to resist.

This machine is entirely automatic in its action, and by its use a considerable saving of labor is secured over the present method of manufacturing tubes for such purposes, which require much hand labor, and, moreover, the tubes are jointless and consequently much better in various ways.

The machine consists of a series of rollers mounted on a suitable base-plate and preferably connected by a continuous traveling band. This traveling band embraces an endless mandrel preferably round about three-quarters of its circumference and is caused to travel at a variable speed by means of an expanding and contracting driving-pulley. The mandrels may be of any desired shape or length and are constructed of wire or steel strip in skeleton or may be solid or may be of fabric and india-rubber tubes, which latter may be inflated with air, wholly or partly filled with sand, or otherwise distended.

Supported upon the base-plate at suitable intervals one or more revolving annular shuttles or cages are provided, driven by gearing at the required speed. Only one is shown and described herein for the purpose of illustration. These cages or shuttles carry one or more reels or bobbins containing the thread, and in addition are made to open so that they can be passed over and off the mandrel.

The thread may while being wound pass through a bath of rubber solution or may have been previously treated with it and during the process of winding be subjected to a spray of naphtha solvent. This facilitates the winding operation and also causes the threads to adhere to one another.

Reference is to be had to the accompanying drawings, forming a part of this specification, in which similar letters of reference indicate corresponding parts in all the figures.

Figure 1 is a plan of the improved winding-machine. Fig. 2 is a side elevation of the same. Fig. 3 is a cross-section through the winder on line 1 1 of Fig. 2, looking in the direction of the driving-gear; and Fig. 4 is a section on line 2 2 of the plan shown in Fig. 5 of the expanding and contracting driving-pulley.

The winding-machine is provided with a suitably-constructed main frame or base-plate A, which is supported by a standard B and is operated by the fast pulley C C', being a loose pulley, onto which the driving-band may be shifted when it is desired to put the machine out of action. Motion is communicated through the shaft $C^3$ first to the expanding pulley D through the worm D' and worm-wheel $D^2$, and, secondly, to the rotary cage by means of the spur-gearing E E' $E^2$. For winding a thread about the mandrel a differentiating means, embodying a reversible rotary winding-cage, the bobbin therein, and reversible gearing for operating the cage, is employed, arranged and operating as follows:

Between the worm D' and gear-wheels E, E', and $E^2$, I place a train of bevel gear-wheels for reversing the motion of the rotary winding-cage H. As the direction of rotation of the mandrel remains always the same, it is obvious that by reversing the motion of the winding-cage the thread will be wound at an opposite angle to that already laid.

The above mechanism for reversing acts in the following manner: The bevel-pinions $c^1$ $c^5$ run loosely upon the shaft, and between them I place a clutch $c^6$, engaging with a feather upon the shaft, having projections at each end, which engage with recesses in either of the bevel-pinions. The position of the clutch can be changed by means of a lever $c^\times$. Below the bevel-pinions I place a crown-wheel $c^7$, with which the bevel-pinions $c^4$ $c^5$ mesh. The crown-wheel $c^7$ conveys motion through its shaft to another similar wheel $c^8$. This in turn meshes with the bevel-wheel $c^9$ and by means of the shaft $c^{10}$ communicates motion to the gear-wheels E, E', and $E^2$. A reversal of the direction of rotation is produced by operating the lever $c^\times$ so as to cause the clutch $c^6$ to engage with either the bevel-pinion $c^4$ or $c^5$. The pulley D operates the endless band F, which embraces the mandrel G for about three-quarters of its circumference and is kept in its proper position by means of the flanged rollers F' $F^2$ $F^3$, and suitable tension devices are provided at $F^4$ and $F^5$ for adjusting the tension thereof.

The winding cage or shuttle H is operated by means of the spur-gearing E E' $E^2$. This cage H (see enlarged section, Fig. 3) is formed in two parts, which are kept closed by means of the hook and pin $h$ $h'$ and by a spring $h^2$ on the opposite side. The cage is connected to the spur-gearing $E^2$ and consists of side plates, which are connected by means of distance-pieces $h^3$. One of these acts as a bearing-spindle for the thread reel or bobbin $h^4$, which is provided with any suitable tension device. (Not shown.) The thread first passes over a cross-pin $h^5$ and then through an eyelet $h^6$, secured to one side plate of the winder. If more than one bobbin be used, the several threads may be laid either together on a band at one point in the transverse circumference of the mandrel or separately at points uniformly distributed around the transverse circumference. The cage is supported by friction-wheels $h^7$, the lower ones being secured to the frame; but the upper ones are supported by cranked arms $h^8$, which are journaled in supports cast on the frame. The cranked arms $h^8$ are constantly kept in contact with the upper portion of cage H by means of the springs $h^9$, the object of this being to allow of the cage being removed and opened for the purpose of introducing the mandrel G.

The expanding driving-pulley D (see Figs. 4 and 5) is of the following character: Conical disks $d$ $d'$ are surrounded by an elastic band $d^3$. Attached to the worm-wheel shaft is a disk $d^4$, in which are placed three right and left handed screws $d^5$, which engage, respectively, with the disks $d$ $d'$. At the upper end of each of the screws gear-wheels $d^6$ are secured, which mesh with a central wheel $d^7$, which can be operated by means of a handle $d^8$. By turning the handle $d^8$ in one direction or the other the conical disks are caused to move either nearer to or farther from each other. In this manner the elastic band $d^3$ will be either expanded or reduced in diameter and a very minute change can be effected in the speed of band F.

The operation of the winding-machine is as follows: The endless mandrel G is placed in position, as shown in plan, Fig. 1, and the tension on the endless band F is adjusted by means of the devices shown at $F^4$ and $F^5$. The machine is now started, and by means of the adjustable pulley D the mandrel is rotated at the proper speed by means of the traveling band, and at the same time the winding-cage H is operated by the intermediate gearing to cause one layer of thread from the bobbin $h^4$ to be laid in a spiral direction, as indicated by the line $g$. When one revolution of the mandrel has been made, a second layer of thread is wound around the mandrel in contact with the first layer, and this is continued until the mandrel is quite covered, as shown by the small portion in Fig. 1 at $g'$. When the above operation is completed, the rotation of the winding-cage is reversed by operating the lever $c^\times$, and a second winding of thread is laid in a similar manner to that above described, but at the opposite angle. The machine is now stopped and the winding-cage, with the wound tube and mandrel, removed from its supports. The cage is next opened by releasing the hook $h$ from the pin $h'$. A fresh mandrel is now inserted therein and the winding-cage and mandrel again secured in position, and the operation as above described can be repeated.

When it is desired to adjust the pitch or angle in which the threads are laid, suitable change-wheels for varying the relative speed of the parts, as will be readily understood by an engineer, can be used. The relative speed between the rotation of the mandrel and the winding-cage, so as to cause the threads to be laid in sequence, can be effected by operating the adjusting-handle $d^8$ on the expanding driving-pulley D, as before explained.

I do not restrict myself to the particular methods of operating the machine, as equivalent mechanical devices may be used to effect the same purpose, and also adjustments may be introduced to enable one machine to take various sizes of mandrels and one or more winding-cages may be used.

Having fully described my invention, I claim as new and desire to secure by Letters Patent—

1. In a winding-machine, such as described, the combination of an expansible driving-pulley for impelling a continuous band around a mandrel, a series of guide-rollers for keeping said band in the plane of rotation of the mandrel, and one or more winders for the mandrel, having a reversible feed, substantially as described.

2. In a winding-machine, such as described, for winding a thread about an annular rotative mandrel, the combination of a series of guide-rollers peripherally disposed about the mandrel, an expansible driving-pulley, an endless band impelled thereby, passing over the guide-rollers and around the mandrel and adapted to impart a continuous motion thereto, one or more tension devices for the band, and a differentiating means for winding a thread about the mandrel, substantially as described.

3. In a winding-machine, such as described, the combination with the gearing which drives the mandrel and retaining winder or cage at a fixed relative speed, of means whereby the roller which drives the traveling band may be expanded and contracted in circumference so that the relative speed of revolution of the mandrel and winder may be varied and adjusted, substantially as and for the purpose hereinbefore set forth.

4. In a machine, such as described, the combination of means for winding a thread about a continuously-driven mandrel in a forward direction and then reversing the angle of said thread, consisting of an annular cage or shuttle, a bobbin revolubly carried thereby, means for rotating the shuttle in a forward direction, and clutch mechanism connected therewith for reversing the motion of the shuttle, substantially as set forth.

5. In a machine, such as described, the combination of a shuttle, a bobbin carried thereby, means for rotating the shuttle, and clutch mechanism connected therewith for reversing the motion of the shuttle, substantially as set forth.

6. In a machine, such as described, the combination of an annular shuttle, a carrying means therefor, a bobbin revolubly carried thereby, means for rotating the shuttle, and clutch mechanism connected therewith for reversing the motion of the shuttle, as and for the purpose set forth.

7. The combination in an expansible pulley, of the central disk $d^4$, the disks $d\ d'$ located one either side thereof and connected with one another by the double-threaded screws $d^5$, said outer disks having their inner peripheries converged or beveled to receive a band of elastic material, substantially as shown and described.

8. In a machine, such as described, a differential thread-winding device, comprising a support, a rotary winding-cage carried thereby, reversible gearing for operating the same, a bobbin revoluble in said cage, a crank-arm carried by the support, and friction-rollers carried by said arm and support and bearing against the cage, substantially as specified.

9. In a winding-machine, such as described, the combination with means for driving the mandrel, of a two-part shuttle-carrier through which the mandrel travels, a rotative shuttle carried thereby, a locking device for the carrier, friction-rollers radially disposed around the shuttle, and a pair of pivoted crank-arms normally pressing upon the upper portion of the shuttle-carrier, substantially as specified.

In testimony whereof I have hereunto set my hand, in presence of two subscribing witnesses, this 21st day of December, 1898.

JOHN HUBBARD.

Witnesses:
THOMAS DUNN,
FRED C. HARRIS.